J. O. WALKER.
LOCK NUT.
APPLICATION FILED OCT. 19, 1907.
908,363.
Patented Dec. 29, 1908.
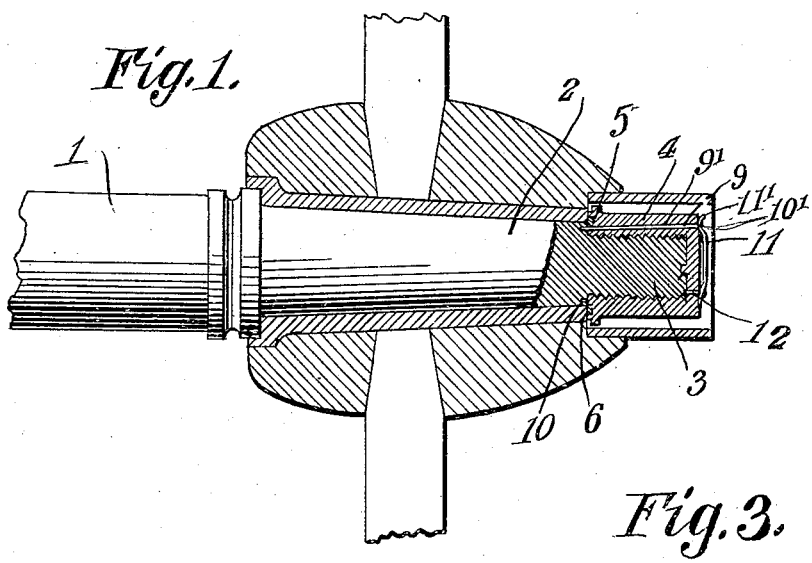
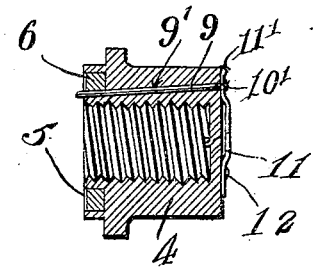
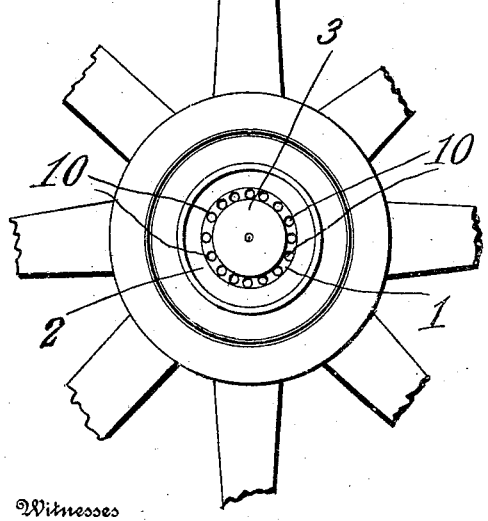
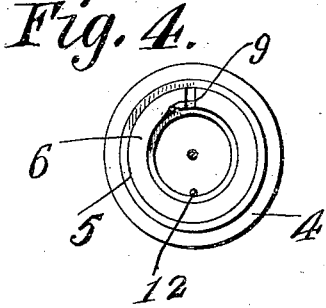
Witnesses
Joe. P. Walker.
Irving J. King.
Inventor,
John O. Walker.
By Victor J. Evans.
Attorney

UNITED STATES PATENT OFFICE.

JOHN O. WALKER, OF MEMPHIS, TENNESSEE.

LOCK-NUT.

No. 908,363.     Specification of Letters Patent.     Patented Dec. 29, 1908.

Application filed October 19, 1907.   Serial No. 398,230.

*To all whom it may concern:*

Be it known that I, JOHN O. WALKER, a citizen of the United States, residing at Memphis, in the county of Shelby and State of Tennessee, have invented new and useful Improvements in Lock-Nuts, of which the following is a specification.

This invention relates to improvements in hubs, and has relation more particularly to means for securing the hub to its spindle.

It is an object of the invention to simplify and improve the construction and operation of this class of devices and to provide a novel nut lock for vehicle wheels, whereby the wheel will be securely held on the axle and retain the same against accidental displacement.

It is also an object of the invention to provide a novel device of this character wherein means are provided for holding the nut in positive engagement with the spindle of the axle.

Furthermore, it is an object of the invention to provide a novel device of this character that is simple in construction, efficient in practice and economical to manufacture.

With the above and other objects in view, the invention consists in the details of construction and in the arrangement and combination of the parts hereinafter more fully described and claimed.

In the accompanying drawings; Figure 1, is a vertical sectional view illustrating the invention in applied position. Fig. 2 is a front plan view of Fig. 1, with the nut removed therefrom. Fig. 3 is a sectional view of a nut, clearly illustrating the locking device in active position. Fig. 4 is a rear plan view of Fig. 3.

Referring more particularly to the drawings, 1 denotes the axle and 2 its spindle. The spindle 2 is provided at its forward end with the ordinary extended reduced threaded portion 3, the said portion being adapted to receive the internally screw-threaded nut 4, as is more clearly shown in Fig. 3. Formed on the rear face of the internally screw threaded nut 4, is a cup-shaped recess 5, made as shown and adapted to receive a split washer 6, the said washer engaging the front faces of the hub and spindle when the nut 4 is screwed on the threaded portion 3 of the spindle. The nut is further provided with a longitudinal locking pin 9, and having a head 10' for holding the pin in engagement with the keeper or spring 11 having a portion spaced from the outer face of the nut or pressed outwardly therefrom, said pin being adapted to engage the sockets 10 in the forward face of the spindle and the said pin is held in locking position therewith by means of the spring or keeper 11, said spring or keeper having a free end 11' which permits the pin to be partially withdrawn to allow the nut to be adjusted or rotated upon the extended reduced threaded portion of the spindle and also permits the insertion of the pin through the spring. The pin 9 extends through a longitudinal diagonally disposed opening 9 in the nut and is adapted for free movement therein. The spring 11, is fastened to the face of the nut, adjacent one of its sides by means of a fastening member, such as a rivet 12, the locking pin 9 passes through the spring adjacent its free end 11' and the same is held in positive engagement with the sockets 10 by means of the tension of the spring 11. The said split washer 6 is such that it serves to frictionally engage a portion of the pin 9 adjacent to the inner end thereof to assist in the action of the spring 11 to prevent accidental movement of the said pin.

Having thus fully described the invention what is claimed as new is:

The combination with a spindle having a reduced threaded end, said spindle having an annular series of sockets surrounding the reduced threaded end at the inner end thereof, and a skein mounted upon the spindle, of a nut mounted upon the reduced threaded end and provided with a cup shaped recess, a split washer mounted in the recess, a leaf spring secured to the nut and provided with an outwardly pressed portion spaced from the outer face of the nut, said nut having a diagonally disposed passage formed therein opening at one end into the recess and at its other end on the outer face of the nut, and a pin carried by the spring and slidably mounted in the passage and adapted to be seated at its inner end in one of the sockets formed in the said spindle, said split washer serving to frictionally engage a portion of the pin adjacent to the inner end thereof to assist in the action of the spring to prevent accidental movement of the said pin.

In testimony whereof I affix my signature in presence of two witnesses.

JOHN O. WALKER.

Witnesses:
 W. T. THWEATT,
 RHEA B. STEELE.